United States Patent
Hammond et al.

[11] Patent Number: 6,055,804
[45] Date of Patent: May 2, 2000

[54] TURNING VANE ARRANGEMENT FOR IR SUPPRESSORS

[75] Inventors: Mark H. Hammond, Southington; James H. Riffanacht, Cheshire, both of Conn.

[73] Assignee: Sikorsky Aircraft Corporation, Stratford, Conn.

[21] Appl. No.: 08/898,904

[22] Filed: Jul. 23, 1997

[51] Int. Cl.$^7$ .................................................. B64D 33/04
[52] U.S. Cl. ........................... 60/39.5; 60/231; 60/271; 239/265.17; 239/265.19
[58] Field of Search .......................... 60/39.5, 230, 231, 60/271; 239/265.17, 265.19; 181/213

[56] References Cited

U.S. PATENT DOCUMENTS

| | | | |
|---|---|---|---|
| 3,212,700 | 10/1965 | Guienne et al. | 230/103 |
| 3,566,823 | 3/1971 | Hope-Gill | 60/230 |
| 3,685,612 | 8/1972 | Bertin | 181/33 HC |
| 3,921,906 | 11/1975 | Nye et al. | 239/127.3 |
| 3,926,373 | 12/1975 | Viets | 239/265.17 |
| 3,981,448 | 9/1976 | Demogenes et al. | 239/127.3 |
| 4,007,587 | 2/1977 | Banthin et al. . | |
| 4,018,046 | 4/1977 | Hurley | 60/264 |
| 4,095,417 | 6/1978 | Banthin | 60/39.5 |
| 4,099,375 | 7/1978 | Inglee . | |
| 4,198,817 | 4/1980 | Fujita et al. | 60/319 |
| 4,215,537 | 8/1980 | Hurley | 60/264 |
| 4,312,480 | 1/1982 | Miller . | |
| 4,800,715 | 1/1989 | Conway | 60/39.5 |
| 4,830,315 | 5/1989 | Presz, Jr. et al. | 244/200 |
| 4,835,961 | 6/1989 | Presz, Jr. et al. | 60/264 |
| 5,746,047 | 5/1998 | Steyer et al. | 60/39.5 |

FOREIGN PATENT DOCUMENTS

| | | | |
|---|---|---|---|
| 2 087 076 | 12/1971 | France . | |
| 3129305 C2 | 1/1989 | Germany . | |
| 2034414 | 6/1980 | United Kingdom | 60/39.5 |

*Primary Examiner*—Stephen M. Johnson
*Attorney, Agent, or Firm*—Brian A. Collins

[57] ABSTRACT

A turning vane arrangement (30) for an IR suppressor having a duct (32) adapted for receiving a primary flow PF of engine exhaust. The turning vane arrangement (30) is operative to direct a pressurized secondary flow PSF of low temperature gaseous fluid into the primary flow of engine exhaust for reducing the IR energy thereof. The turning vane arrangement (30) includes at least one turning vane (50) situated in the duct (32) and is characterized by a trailing edge ($50_{TE}$) that defines an exhaust nozzle (52). The exhaust nozzle (52) is adapted for being disposed in fluid communication with a flow source (54) which produces the pressurized secondary flow PSF. The exhaust nozzle may include a plurality of adjoined lobes ($60_R$, $60_A$ or $60_P$) for rapidly and thoroughly admixing the primary and pressured secondary flows PF, PSF.

26 Claims, 3 Drawing Sheets

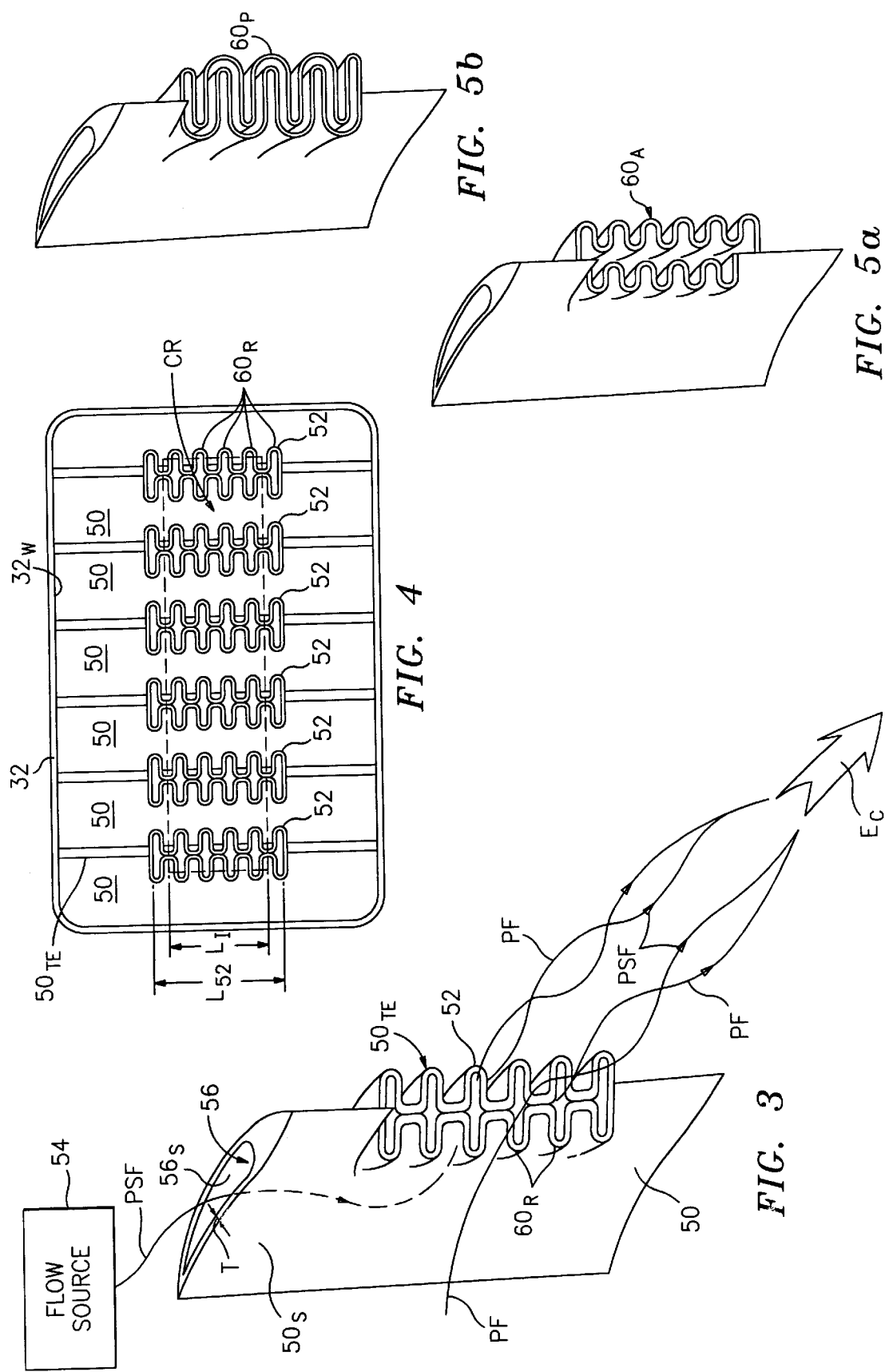

TURNING VANE ARRANGEMENT FOR IR SUPPRESSORS

TECHNICAL FIELD

This invention is directed to InfraRed (IR) Suppressors for engines, and more particularly, to a turning vane arrangement therefor operative to suppress the infrared radiation emitted by an engine.

BACKGROUND OF THE INVENTION

The exhaust plume of gas turbine engines, e.g., military aircraft engines, is a source of high infrared energy which may be used for targeting/tracking purposes by heat seeking missiles and/or various forms of infrared imaging systems, e.g., Night Vision Goggles (NVGs). With respect to the former, heat seeking missiles obtain directional cues from the infrared energy, which directional cues are more precise depending upon the intensity, e.g., temperature, and total energy emitted by the exhaust plume. Regarding the latter, infrared imaging systems amplify the infrared energy by a factor of about 10,000 and may be used by hostile forces for early detection and/or targeting of surface-to-air/air-to-air missiles. Accordingly, it is highly desirable to reduce the infrared emissions (also referred to as the IR signature) of such engines to a practical minimum to avoid detection, acquisition and/or tracking by enemy threats/forces.

Various infrared suppression systems have been designed and fielded which effect mixing of low temperature ambient air with the high temperature engine exhaust to reduce the IR signature radiated therefrom. Generally, it is the principle objectives of such systems to: (a) reduce the infrared energy below a threshold level (e.g., a level capable of being sensed by the perceived threat), (b) maintain engine performance, and, (c) minimize the weight penalties associated therewith. Secondary objectives may include: (i) minimizing system or configuration complexity to reduce fabrication costs, (ii) minimizing the external aerodynamic drag produced by such IR suppressors, and/or (iii) suppressing the acoustic emissions emanating therefrom which may also be a source of detection.

Hurley U.S. Pat. No. 4,018,046 discloses an InfraRed (IR) suppressor for reducing the infrared radiation emitted from the exhaust plume and/or hot metal parts of a gas turbine engine. The IR suppressor includes an ejector vane assembly which is adapted for receiving a primary flow of engine exhaust and which is operative to entrain a first flow of cooling air into the primary exhaust flow. The primary flow of gases diffused from and entrained by the ejector vane assembly are fed into an arcuate duct which, due to its spatial position relative to the ejector vane assembly, produces an annular space for entraining a second flow of cooling air. The first and second flows are admixed with the primary exhaust flow to effect heat transfer therebetween and, consequently, to suppress the IR signature emitted from the exhaust plume. Additionally, the curved shape of the arcuate duct and the use of turning vanes disposed internally thereof, serve to prevent direct line-of-sight viewing into the IR suppressor. That is, the shape and/or occluding characteristics of the turning vanes prevents viewing of radiant energy emitted by hot internal components such as from the ejector vane assembly or from the turbine section of the engine.

The ejector vane assembly described therein includes a plurality of V-shaped ejector vanes which entrain cooling air at a plurality of angularly spaced positions while additionally serving to introduce air toward the center or "core" of the engine exhaust. More specifically, each of the ejector vanes forms a V-shaped channel which is open to ambient air at one end thereof and is oriented to direct flow radially toward the core of the primary exhaust flow. The ejector vane assembly, furthermore, clusters the ejector vanes as close as practicable to the core of the primary exhaust flow and, furthermore, includes a means for adjusting the flow area through the ejector vanes to ameliorate engine performance. That is, the adjustment means effects collapse of each ejector vane so as to increase the flow area and reduce the back-pressure on the engine.

While the ejector vane assembly improves mixing, i.e., reduces the IR signature, by directing cooling air into a core region of the engine exhaust, it will be appreciated that the ejector vane assembly requires a large number of individual components. As such, the multiplicity of components, each being a potential source of repair and maintenance, reduces the overall reliability of the IR suppressor system. Furthermore, while the adjustment means attempts to reduce flow restriction, the anticipated power loss produced by the ejector vane assembly is on the order of between 3% to 6%. In view of the fact that even small variations in efficiency, i.e., on the order of ½% to 1%, have significant impact on engine performance, such power loss may be viewed as intolerable for certain aircraft and/or aircraft missions wherein maximum gross weight, flight speed, and range are critical design parameters.

Furthermore, while the turning vanes serve to redirect the exhaust flow and prevent direct line-of-sight viewing internally of the arcuate duct, impingement of the high temperature exhaust gases on the surfaces thereof can cause the turning vanes to become a significant source of infrared radiation. That is, depending upon the temperature reduction effected by the first stage of the suppressor, i.e., the ejector vane assembly, the temperature of the turning vanes can significantly contribute to the IR signature of the suppressor.

Miller U.S. Pat. No. 4,312,480 discloses a gas diffusion and radiation shielding apparatus for a turbine engine which provides multiple stages for entraining cooling air into a primary flow of high temperature engine exhaust, and a plurality of channels for segmenting the primary flow into smaller, more efficient, mixing streams. Furthermore, the channels include sidewalls which are functionally equivalent to turning vanes for redirecting the primary flow and preventing direct line of sight viewing to the interior of the apparatus/engine. Moreover, the sidewalls define internal conduits for entraining a cooling flow of air to reduce the surface temperature of the sidewall and the IR signature emitted thereby. More specifically, each internal conduit includes an inlet disposed along the upper and lower edges of the channel and an outlet disposed along a leading edge which opposes the primary flow of exhaust gases. In operation, the high-velocity low-pressure primary flow draws a "reverse flow" of cooling air through the conduit which is diffused via the leading edge outlet. As such, the cooling air reduces the surface temperature of the sidewalls and, consequently, the IR signature.

While IR radiation emitted by the channels, and more specifically, the sidewalls, is reduced via the reverse flow of cooling air, the reduction in IR signature is marginally beneficial, especially when compared to the cost of fabricating such internal conduits. Furthermore, by directing cooling air outwardly from the leading edge of the sidewall, back-pressure is produced which degrades engine performance.

Presz et al. U.S. Pat. Nos. 4,835,961 and 4,830,315 describe nozzle configurations for mixing/pumping fluid.

More specifically, the Presz '961 and '315 patents describe single and multi-stage mixer/ejector nozzles, respectively, each having a plurality of adjoined lobes formed at an outlet end thereof. The adjoined lobes define a primary flow trough for channeling a primary flow of high velocity/energy fluid, such as the exhaust of a gas turbine engine, and a secondary flow trough for channeling a secondary flow of low velocity/ energy fluid such as ambient air. The primary and secondary flow troughs are alternately disposed about the periphery of the nozzle such that thin sheets of high energy fluid flow from the trough outlets, transfer kinetic energy to the low energy fluid, and entrain the secondary flow into the primary flow. Aside from simple viscous or shear mixing, the adjoined lobes produce axial vortices which rapidly admix the primary and secondary flows. As such, the adjoined lobes described in the Presz '961 and '315 patents are known to have utility on aircraft engines to both increase thrust and for suppressing the thermal energy radiated from the engine.

While the adjoined lobes serve to rapidly admix the primary and secondary flows to reduce the IR signature, the nozzle configurations disclosed therein fail to fully mix the flows, particularly in the core region of the primary exhaust flow. That is, in all of the embodiments described therein, the lobes entrain the secondary cooling flow into a perimeter region of the flow such that a central core or band of high temperature exhaust remains as the flow exits the nozzle. While the core of high temperature flow will eventually admix downstream, it will be appreciated that the degree of IR suppression is compromised until such energy is diffused.

Aside from the IR emissions radiated by the engine, yet another source of detection includes the observable "radar signature" of the aircraft. The radar signature of an aircraft may be defined as the level of electromagnetic energy returned, i.e., reflected back, to a scanning radar when the aircraft is in the detection range or interrogation field of the radar. Depending upon the radar signature of the aircraft, the scanning radar may provide early detection so that appropriate countermeasures may be taken, or, if the radar signature is below the detection level of the scanning radar, may be entirely ineffective. Accordingly, for aircraft conducting covert operations, it is highly desirable to reduce the radar signature of the aircraft to obviate an enemy's ability to conduct countermeasures.

While many techniques are available to reduce the radar signature of an aircraft, the most common methods include select shaping of aircraft structure to direct the impinging radar away from its source, utilizing low-dielectric materials to make aircraft structure "invisible" to radar, and/or employing radar absorbent materials to attenuate to radar energy. As a general rule, it is desirable to maintain smooth exterior surfaces having relatively constant electrical properties for reflecting and/or attenuating the radar energy.

Insofar as IR suppressors typically require a complex geometric profile which cannot be readily "shaped" to reduce radar signature, it is common practice to apply radar absorbent materials to the exposed surfaces of such suppressors to effect signature reduction. Other approaches may involve select placement of the IR suppressor outlet which placement prevents radar line-of-sight viewing relative to an anticipated radar azimuth angle. For example, by placing the outlet upward, the aircraft fuselage may effectively occlude the suppressor outlet. Notwithstanding the method employed, it will be appreciated that the impact on radar signature is exacerbated on aircraft requiring multiple IR suppression apparatus.

SUMMARY OF THE INVENTION

It is an object of the present invention to provide a turning vane arrangement for an IR suppressor which is adapted for rapidly and thoroughly mixing a low temperature gaseous fluid into a primary flow of high temperature engine exhaust.

It is another object of the present invention to provide such a turning vane arrangement which is adapted for infusing the low temperature gaseous fluid into a core region of the primary exhaust flow.

It is yet another object of the present invention to provide such a turning vane arrangement which mitigates the Infra-Red (IR) signature radiated from the surfaces of the turning vanes.

It is yet a further object of the present invention to provide such a turning vane arrangement which reduces engine back-pressure for improved engine performance.

It is still another object of the present invention to provide such a turning vane arrangement which integrates a primary exhaust flow from another flow source to reduce the overall radar signature of the aircraft.

These and other objects are achieved by a turning vane arrangement for an IR suppressor having a duct adapted for receiving a primary flow of engine exhaust. The turning vane arrangement is operative to direct a pressurized secondary flow of low temperature gaseous fluid into the primary flow of engine exhaust for reducing the IR energy thereof. The turning vane arrangement includes at least one turning vane situated in the duct and is characterized by a trailing edge that defines an exhaust nozzle. The exhaust nozzle is adapted for being disposed in fluid communication with a flow source which produces the pressurized secondary flow. The exhaust nozzle may include a plurality of adjoined lobes for rapidly and thoroughly admixing the primary and pressured secondary flows.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIG. 3 is an isolated perspective view of a single turning vane employed in the turning vane arrangement and the exhaust nozzle configuration employed along the trailing edge thereof;

FIG. 4 is an end view of the turning vane arrangement for defining the core region of the primary exhaust flow and the placement of the turning vane nozzles relative thereto; and FIGS. 5a and 5b depict various alternate embodiments of the exhaust nozzle configuration useful in the turning vane arrangement according to the present invention.

BEST MODE FOR CARRYING OUT THE INVENTION

The exemplary embodiments of the present invention will be described in the context of a helicopter gas turbine engine, though, it will be appreciated that the teachings described herein are applicable to any engine/vehicle wherein the suppression of InfraRed (IR) energy is desired.

Furthermore, the invention will be described in the context of an IR suppressor having multiple ejector stages, though it will be appreciated that the teachings are applicable to single or multi-stage mixer/ejectors. Furthermore, while the described embodiment of the invention relates to integrating the exhaust flows of a turbo-shaft engine and a transmission oil cooler, the invention may be used in combination with a single engine, multiple engines or multiple exhaust flows, whether or not produced by an engine.

Figure 1:
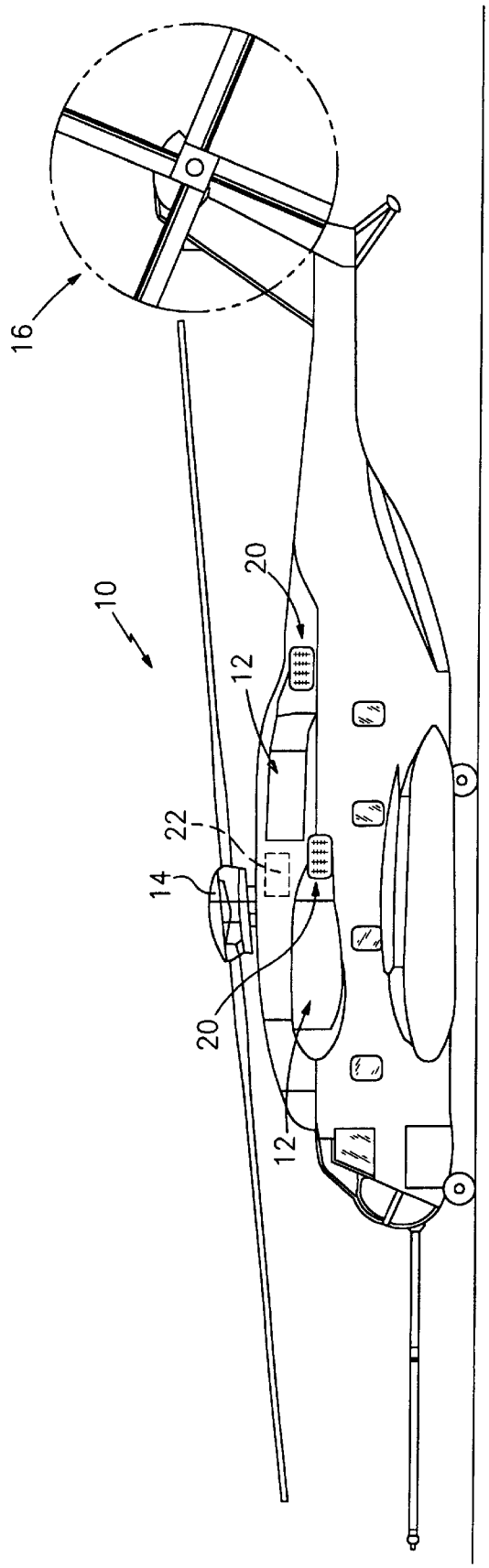
FIG. 1 is a profile view of a helicopter illustrating an exemplary installation of an IR suppressor employing a turning vane arrangement according to the present invention.

Referring now to the drawings wherein like reference characters identify corresponding or similar elements throughout the several views, FIG. 1 shows a helicopter 10 having one or more gas turbine engines 12 for driving a main and tail rotor, 14 and 16, respectively. An IR suppressor 20 embodying features of the present invention is disposed in combination with the aft end of each gas turbine engine 12 and is operative to suppress the InfraRed (IR) signature radiated from the high-temperature exhaust of the respective engine 12. In the context used herein, "to suppress" means that the IR signature emanating from the gas turbine engine 12 is reduced below some predetermined threshold value which is indicative of the acquisition, tracking and/or targeting capability of a particular IR threat. Also shown is an oil cooler 22 for cooling the lubricating oil circulated through a main helicopter transmission (not shown). The oil cooler 22 includes a heat exchanger and fan (not shown) and exhausts a flow of pressurized air having a temperature of about 180–220 degrees Farenheit. Such exhaust flow may be characterized as "low temperature" relative to the high temperature exhaust of the engine 12, which exhaust is about 1200 to 1400 degrees Farenheit.

Figure 2:
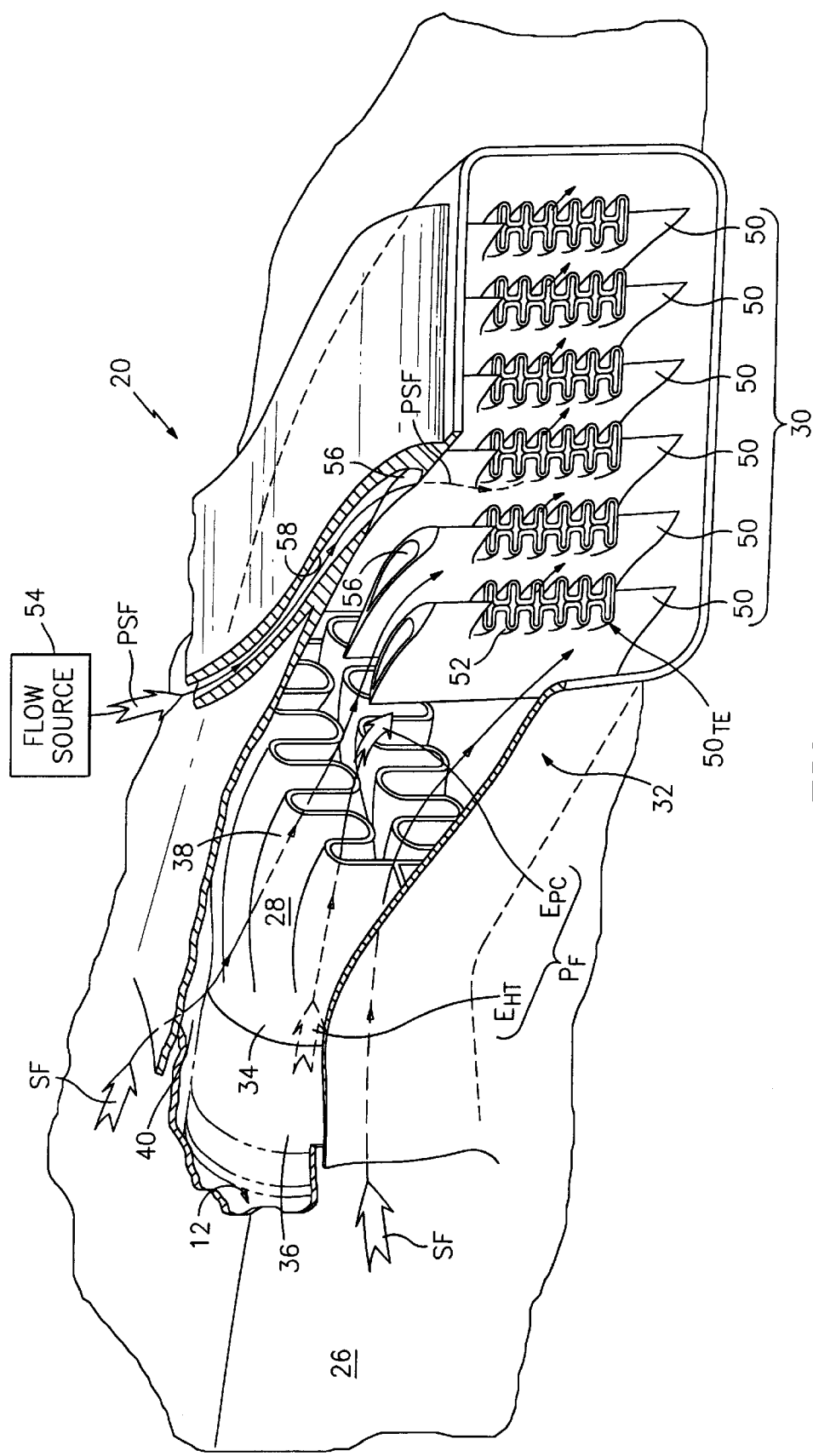
FIG. 2 is a partially broken-away perspective view of the IR suppressor for revealing the internal details of the turning vane arrangement and for illustrating the various fluid flow paths through and around the turning vanes arrangement.

In FIG. 2, a partially broken-away perspective view of the IR suppressor 20 is shown in combination with the aft end of the engine 12 and in position relative to the helicopter fuselage 26. The IR suppressor 20 comprises a first stage exhaust nozzle 28 and a turning vane arrangement 30 according to the present invention situated downstream thereof. Furthermore, the IR suppressor includes a shroud/duct 32 which envelopes the first stage exhaust nozzle 28 and which surrounds and supports the turning vanes 30. More specifically, the first stage exhaust nozzle 28 includes an inlet conduit 34 which is disposed in combination with the engine exhaust casing 36 and a plurality of adjoined lobes 38 which form an outlet end of the first stage exhaust nozzle 28. In operation, the first stage exhaust nozzle 28 is adapted for receiving a primary flow PF of high temperature exhaust $E_{HT}$ from the engine 12 and diffuses the same through the adjoined lobes 38. The effluent primary flow PF entrains a secondary flow SF of low temperature gaseous fluid, e.g., ambient air, through an annular flow passage 40 defined by the shroud/duct 32. The fluid dynamics principle for entraining such secondary flow SF is well-known in the art and is often referred to as a "venturi effect". In addition thereto, the wave-shape configuration of the adjoined lobes 38 engenders the formation of axial vorticies which rapidly admixes the primary and secondary flows PF, SF to produce a primary flow PF of partially cooled exhaust $E_{PC}$. Such lobe configuration and mixing principle is known in the art and more fully described in Presz et al. U.S. Pat. No. 4,835,961.

The primary flow of partially-cooled exhaust Epc is directed downstream via the shroud/duct 32 toward the turning vane arrangement 30 of the present invention. In FIGS. 2 and 3, the turning vane arrangement 30 comprises at least one turning vane 50 having a trailing edge $50_{TE}$ which defines an exhaust nozzle 52. The exhaust nozzle 52 is disposed in fluid communication with a flow source 54 which provides a pressurized secondary flow PSF of low temperature gaseous fluid. In the described embodiment, such pressurized secondary flow PSF is channelled by a fluid communication means which comprises an internal conduit 56 disposed within the exhaust nozzle 52 and an external conduit 58 (FIG. 2) disposed between the flow source 54 and the internal conduit 56. In the broadest sense of the invention, the flow source 54 is any low-temperature, fluid flow source capable of imparting momentum to the primary flow PF of engine exhaust. And, in the described embodiment, the flow source 54 is the transmission oil cooler 22 (FIG. 1)

In FIG. 4, the exhaust nozzle 52 of each turning vane is adapted for being disposed in a "core region" of the shroud/duct 32. As used herein, the "core region" CR means the centermost 30% of the flow area, i.e., the area defined and bounded by the inner wall $32_W$ of the shroud/duct 32, at an axial location corresponding to the trailing edge $50_{TE}$ of the turning vain 50. Furthermore, it should be understood that the core region of the shroud/duct also corresponds to the core region of the primary exhaust flow PF which is typically the hottest portion of the primary flow PF. In the preferred embodiment, the exhaust nozzle 52 is configured and situated along the trailing edge $50_{TE}$ so as to span a length $L_I$ which corresponds to its intersection of the core region CR, i.e., the turning vane intersection length. More specifically, the exhaust nozzle 52 spans a length $L_{52}$ which is equal to or greater than the intersection length $L_I$.

While, in the broadest sense of the invention, the exhaust nozzle 52 may be a simple elongate slot, the exhaust nozzle 52 of the preferred embodiment defines a plurality of adjoined lobes 60. More preferably, the adjoined lobes 60 define a reflective lobe configuration $60_R$ wherein a "mirror-image" of the lobe configuration $60_R$ is provided on both sides of the exhaust nozzle. The import of such lobe configuration $60_R$ will be discussed in subsequent paragraphs.

Referring collectively to FIGS. 2–4, the turning vane arrangement 30 provides a number of mechanisms, some known in the art and others which are the subject of this invention, to reduce the IR signature radiated by the engine 12. Firstly, as is known in the art, the turning vane arrangement 30 serves to redirect the primary flow so as to prevent impingement thereof on other fuselage structure. Secondly, in conventional fashion, the turning vane arrangement 30 prevents direct line-of-sight viewing into the interior of the IR suppressor 20. Accordingly, radiant energy emitted by hot internal components such as the turbine section of the engine 12 is occluded from viewing by IR sensing devices/threats.

Thirdly, in accordance with the teachings of the present invention, the turning vane arrangement 30 provides several mechanisms to rapidly and thoroughly mix/cool the primary exhaust flow PF. More specifically, the pressurized secondary flow PSF of low temperature gaseous fluid is caused to flow out the trailing edge exhaust nozzle 52 for admixture with the primary exhaust flow PF. More specifically, and referring to FIG. 3, the adjoined lobes 60 of the exhaust nozzle 52 cause the primary and secondary flows PF, PSF to penetrate each other so as to produce a plurality of axial vortices downstream of the exhaust nozzle 52. The vortices engendered by the lobe configuration effect rapid and thorough admixture of the primary and secondary flows PF, PSF, such that the average temperature of the resultant cooled engine exhaust $E_C$ is about ½ of the temperature of the partially cooled exhaust $E_{PC}$. To improve the efficacy of the heat transfer yet further, the exhaust nozzles 52 are situated in the core region CR of the primary exhaust flow. As such, the pressurized secondary flow PSF is introduced into the hottest portion of the primary exhaust flow PF so as to diminish the IR signature to a maximum practical extent.

Fourthly, to reduce the IR signature radiated by the external surface $50_S$ of a turning vane 50, the internal conduit is configured so as to occupy a substantial portion of the internal volume of the turning vane 50. Generally, the wall thickness T of the turning vane 50 should be minimized to maximize the rate of heat transfer occurring between the exterior surfaces $50_S$ of the turning vane 50 and an interior surface $56_S$ of the internal conduit 56. It will be apparent to one of ordinary skill that an optimum wall thickness T may be determined based on conventional principles of heat transfer.

Finally, in accordance with yet other teachings of the present invention, the turning vane arrangement 30 employs a forced or pressurized flow to reduce engine backpressure, and improve engine performance. That is, by using another flow source 54 which otherwise wastes fluid dynamic pressure, its momentum is added to the primary flow PF so as to reduce the backpressure to the primary engine 12. Furthermore, the integration of the turning vane arrangement 30 with at least one other the flow source 54 aboard the vehicle, i.e., the integrated system, improves the overall IR and radar detectability of the aircraft. That is, the fluid communication means 54, 56 provides a structure which occludes the orifices which would otherwise be sources of IR energy or radar reflectivity.

Although the invention has been shown and described with respect to exemplary embodiments thereof, it should be understood by those skilled in the art that other changes, omissions and additions may be made therein and thereto, without departing from the spirit and scope of the present invention. While the exhaust nozzle has been described as having a reflective lobe configuration $60_R$, other nozzle configurations which are useful include an aligned lobe configuration $60_A$ such as depicted in FIG. 5a, and a penetrating lobe configuration $60_P$ such as shown in FIG. 5b. Similar to the reflective lobe configuration $60_R$, these other lobe configurations $60_A$, $60_P$ utilize the same mixing principle. Furthermore, while the described embodiment includes a dual function shroud/duct 32, i.e., a shroud for producing a first stage ejector and a duct for directing flow downstream, it will be understood that, in the broadest sense of the invention, the turning vane arrangement 30 may be used in combination with a simple duct, i.e., a duct that does not also function as a shroud. While the described embodiment shows the exterior conduit 56 of the fluid communication means 54, 56 as being connected to an upper side of the interior conduit, it will be appreciated that the exterior conduit may be bifurcated to feed both sides, i.e., upper and lower sides, of the interior conduit 54. While the described embodiment describes the the integration of the turning vane arrangement 30 with the pressurized flow of a transmission oil cooler, another source or multiple sources of pressurized air or exhaust may used. For example, engine bleed air or air conditioning exhaust may be of sufficiently low temperature to ameliorate the temperature characteristics of the primary exhaust flow. Furthermore, it may be desirable to integrate multiple other sources into a single system to reduce both IR and radar detectability.

What is claimed is:

1. A turning vane arrangement (30) for an IR suppressor having a duct (32) adapted for receiving a primary flow PF of engine exhaust, the turning vane arrangement (30) having at least one turning vane (50) situated in the duct (32), said at least one turning vane (50) having a trailing edge ($50_{TE}$) that defines an exhaust nozzle (52), said exhaust nozzle (52) adapted for being disposed in fluid communication with a flow source (54) of low temperature gaseous fluid, wherein said flow source (54) of low-temperature gaseous fluid is an oil cooler (22).

2. The turning vane arrangement (30) according to claim 1 wherein said turning vane (50) intersects a core region CR of the primary exhaust flow PF to define an intersection length ($L_I$), and wherein said exhaust nozzle (52) defines a spanwise length dimension ($L_{52}$) which is equal to or greater than said intersection length ($L_I$).

3. The turning vane arrangement (30) according to claim 1 wherein said turning vane (50) defines an internal conduit (56) for channeling the low temperature gaseous fluid to said exhaust nozzle (52), and wherein said turning vane (50) effects heat transfer through a wall thereof from an exterior surface ($50_S$) of said turning vane (50) to an interior surface ($56_S$) thereof defined by said internal conduit (56).

4. A turning vane arrangement (30) for an IR suppressor having a duct (32) adapted for receiving a primary flow PF of engine exhaust, the turning vane arrangement (30) having at least one turning vane (50) situated in the duct (32), said at least one turning vane (50) having a trailing edge ($50_{TE}$) that defines an exhaust nozzle (52), said exhaust nozzle (52) adapted for being disposed in fluid communication with a flow (54) of low temperature gaseous fluid, wherein said exhaust nozzle (52) defines a plurality of adjoined lobes ($60_R$, $60_A$ or $60_P$).

5. The turning vane arrangement (30) according to claim 4 wherein said adjoined lobes ($60_R$, $60_A$ or $60_P$) have a reflective lobe configuration ($60_R$).

6. The turning vane arrangement (30) according to claim 4 wherein said adjoined lobes ($60_R$, $60_A$ or $60_P$) have an aligned lobe configuration ($60_A$).

7. The turning vane arrangement (30) according to claim 4 wherein said adjoined lobes ($60_R$, $60_A$ or $60_P$) have a penetrating lobe configuration ($60_P$).

8. The turning vane arrangement (30) according to claim 4 wherein said turning vane (50) intersects a core region CR of the primary exhaust flow PF to define an intersection length ($L_I$), and wherein said exhaust nozzle (52) defines a spanwise length dimension ($L_{52}$) which is equal to or greater than said intersection length ($L_I$).

9. The turning vane arrangement (30) according to claim 8 wherein said turning vane (50) defines an internal conduit (56) for channeling the low temperature gaseous fluid to said exhaust nozzle (52), and wherein said turning vane (50) effects heat transfer through a wall thereof from an exterior surface ($50_S$) of said turning vane (50) to an interior surface ($56_S$) thereof defined by said internal conduit (56).

10. The turning vane arrangement according to claim 8 wherein said flow source (54) of low-temperature gaseous fluid is an oil cooler (22).

11. The turning vane arrangement (30) according to claim 4 wherein said flow source (54) of low-temperature gaseous fluid is an oil cooler (22).

12. The turning vane arrangement (30) according to claim 2 wherein said turning vane (50) defines an internal conduit (56) for channeling the low temperature gaseous fluid to said exhaust nozzle (52), and wherein said turning vane (50) effects heat transfer through a wall thereof from an exterior surface ($50_S$) of said turning vane (50) to an interior surface ($56_S$) thereof defined by said internal conduit (56).

13. The turning vane arrangement according to claim 12 wherein said flow source (54) of low-temperature gaseous fluid is an oil cooler (22).

14. In a vehicle having at least one engine which produces a primary flow PF of engine exhaust and having at least one other flow source (54) of low temperature gaseous fluid, an integrated system for minimizing the IR and radar detectability of the vehicle, the system including an IR suppressor (20) having a duct (32) adapted for receiving the primary exhaust flow PF; a turning vane arrangement (30) having at least one turning vane (50) situated in the duct (32), said at least one turning vane (50) having a trailing edge ($50_{TE}$) that defines an exhaust nozzle (52); and fluid communication means (54,56) for channeling the low temperature gaseous fluid from the flow source (54) to the exhaust nozzle (52);

wherein said flow source (54) of low-temperature gaseous fluid is an oil cooler (22).

15. The integrated system according to claim 14 wherein said turning vane (50) intersects a core region CR of the primary exhaust flow PF to define an intersection length ($L_I$), and wherein said exhaust nozzle (52) defines a spanwise length dimension ($L_{52}$) which is equal to or greater than said intersection length ($L_I$).

16. The integrated system according to claim 14 wherein said fluid communication means (54, 56) includes an internal conduit (56) disposed within the turning vane (50) for channeling the low temperature gaseous fluid to said exhaust nozzle (52) and an external conduit (58) for channeling the low temperature gaseous fluid from said flow source (54) to said internal conduit (56) of said turning vane (50).

17. The integrated system according to claim 16 wherein said turning vane (50) effects heat transfer through a wall thereof from an exterior surface ($50_S$) of said turning vane (50) to an interior surface ($56_S$) thereof defined by said internal conduit (56).

18. In a vehicle having at least one engine which produces a primary flow PF of engine exhaust and having at least one other flow source (54) of low temperature gaseous fluid, an integrated system for minimizing the IR and radar detectability of the vehicle, the system including an IR suppressor (20) having a duct (32) adapted for receiving the primary exhaust flow PF, a turning vane arrangement (30) having at least one turning vane (50) situated in the duct (32), said at least one turning vane (50) having a trailing edge ($50_{TE}$) that defines an exhaust nozzle (52), and fluid communication means (54 56) for channeling the low temperature gaseous fluid from the flow source (54) to the exhaust nozzle (52);

wherein said exhaust nozzle (52) defines a plurality of adjoined lobes ($60_R$, $60_A$ or $60_P$).

19. The integrated system according to claim 18 wherein said adjoined lobes ($60_R$, $60_A$ or $60_P$) have a reflective lobe configuration ($60_R$).

20. The integrated system according to claim 18 wherein said adjoined lobes ($60_R$, $60_A$ or $60_P$) have an aligned lobe configuration ($60_A$).

21. The integrated system according to claim 18 wherein said adjoined lobes ($60_R$, $60_A$ or $60_P$) have a penetrating lobe configuration ($60_P$).

22. The integrated system according to claim 18 wherein said turning vane (50) intersects a core region CR of the primary exhaust flow PF to define an intersection length ($L_I$), and wherein said exhaust nozzle (52) defines a spanwise length dimension ($L_{52}$) which is equal to or greater than said intersection length ($L_I$).

23. The integrated system according to claim 18 wherein said flow source (54) of low-temperature gaseous fluid is an oil cooler (22).

24. The integrated system according to claim 18 wherein said fluid communication means (54, 56) includes an internal conduit (56) disposed within the turning vane (50) for channeling the low temperature gaseous fluid to said exhaust nozzle (52) and an external conduit (58) for channeling the low temperature gaseous fluid from said flow source (54) to said internal conduit (56) of said turning vane (50).

25. The integrated system according to claim 24 wherein said turning vane (50) effects heat transfer through a wall thereof from an exterior surface ($50_S$) of said turning vane (50) to an interior surface ($56_S$) thereof defined by said internal conduit (56).

26. The turning vane arrangement according to claim 25 wherein said flow source (54) of low-temperature gaseous fluid is an oil cooler (22).

* * * * *